(12) United States Patent
Lu et al.

(10) Patent No.: US 12,133,066 B2
(45) Date of Patent: Oct. 29, 2024

(54) EVENT PROCESSING METHOD AND USER EQUIPMENT

(71) Applicant: GUANGDONG OPPO MOBILE TELECOMMUNICATIONS CORP., LTD., Dongguan (CN)

(72) Inventors: Qianxi Lu, Dongguan (CN); Xin You, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 393 days.

(21) Appl. No.: 17/515,318

(22) Filed: Oct. 29, 2021

(65) Prior Publication Data
US 2022/0053395 A1 Feb. 17, 2022

Related U.S. Application Data

(63) Continuation of application No. PCT/CN2019/085341, filed on Apr. 30, 2019.

(51) Int. Cl.
*H04W 36/00* (2009.01)
*H04W 36/30* (2009.01)

(52) U.S. Cl.
CPC . *H04W 36/00837* (2018.08); *H04W 36/0058* (2018.08); *H04W 36/302* (2023.05)

(58) Field of Classification Search
CPC ....... H04W 36/00837; H04W 36/0058; H04W 36/30; H04W 88/02; H04W 36/005; H04W 24/10; H04W 36/0033
See application file for complete search history.

(56) References Cited

U.S. PATENT DOCUMENTS

| | | | |
|---|---|---|---|
| 9,072,022 B1 * | 6/2015 | Shah | H04W 36/30 |
| 9,510,258 B1 * | 11/2016 | Chaudhuri | H04W 36/24 |
| 9,560,560 B2 * | 1/2017 | Yiu | H04W 36/0094 |
| 9,572,115 B2 * | 2/2017 | Bontu | H04W 52/244 |
| 9,628,229 B2 * | 4/2017 | Bontu | H04B 17/336 |
| 9,693,281 B2 * | 6/2017 | Chockalingam | H04W 36/0058 |
| 10,057,830 B2 * | 8/2018 | Chockalingam | H04W 36/0058 |
| 10,334,490 B2 * | 6/2019 | Zingler | H04W 36/0083 |
| 2012/0214489 A1 * | 8/2012 | Koo | H04W 36/0085 |
| | | | 455/436 |

(Continued)

FOREIGN PATENT DOCUMENTS

| | | | | |
|---|---|---|---|---|
| CA | 2813402 A1 * | 4/2012 | | H04W 16/14 |
| CN | 101610536 A | 12/2009 | | |

(Continued)

OTHER PUBLICATIONS

Second Office action issued in corresponding Chinese Application No. 202111408089.1, issued on Apr. 12, 2023.

(Continued)

*Primary Examiner* — Jay P Patel
(74) *Attorney, Agent, or Firm* — BAYES PLLC

(57) ABSTRACT

Disclosed are an event processing method, a User Equipment (UE), and a non-transitory computer-readable storage medium. The method is applied to the UE and includes measuring relevant signals of at least two events; and when the at least two events meet a configured condition, performing handover.

6 Claims, 5 Drawing Sheets

(56) References Cited

U.S. PATENT DOCUMENTS

| | | | | |
|---|---|---|---|---|
| 2012/0315905 | A1* | 12/2012 | Zhu | H04W 36/36 455/436 |
| 2015/0312818 | A1* | 10/2015 | Yiu | H04W 36/0094 455/436 |
| 2016/0014666 | A1* | 1/2016 | Müller | H04W 36/165 455/436 |
| 2016/0095126 | A1* | 3/2016 | Sridhar | H04W 48/02 370/328 |
| 2016/0165471 | A1* | 6/2016 | Bontu | H04L 1/0026 370/241 |
| 2016/0254886 | A1* | 9/2016 | Bontu | H04L 1/0026 455/452.1 |
| 2016/0285679 | A1* | 9/2016 | Dudda | H04W 24/02 |
| 2016/0360462 | A1* | 12/2016 | Chockalingam | H04W 36/0058 |
| 2017/0070904 | A1* | 3/2017 | Mali | H04L 43/16 |
| 2017/0332302 | A1* | 11/2017 | Ercan | H04W 36/22 |
| 2018/0035345 | A1* | 2/2018 | Chockalingam | H04W 36/30 |
| 2018/0279186 | A1* | 9/2018 | Park | H04W 36/0077 |
| 2018/0279187 | A1* | 9/2018 | Zingler | H04W 24/02 |
| 2020/0053607 | A1* | 2/2020 | Ingale | H04L 5/005 |
| 2020/0119977 | A1* | 4/2020 | Dudda | H04L 41/0661 |
| 2020/0187033 | A1* | 6/2020 | Tang | H04W 36/00835 |
| 2021/0120471 | A1* | 4/2021 | Choi | H04W 36/0058 |
| 2021/0185736 | A1* | 6/2021 | Shi | H04W 72/02 |
| 2021/0250229 | A1* | 8/2021 | Dudda | H04W 24/02 |
| 2023/0291639 | A1* | 9/2023 | Dudda | H04W 36/0055 |

FOREIGN PATENT DOCUMENTS

| | | | | |
|---|---|---|---|---|
| CN | 102104897 | A | | 6/2011 |
| CN | 102215526 | A | | 10/2011 |
| CN | 103309572 | A | | 9/2013 |
| CN | 103826248 | A | | 5/2014 |
| CN | 108882293 | A | | 11/2018 |
| CN | 109151930 | A | | 1/2019 |
| CN | 109391965 | A | | 2/2019 |
| CN | 110913428 | A | * | 3/2020 ............ H04L 43/06 |
| CN | 110913428 | B | * | 4/2022 ............ H04L 43/06 |
| EP | 3122117 | A1 | * | 1/2017 ...... H04W 36/00835 |
| EP | 3836724 | A1 | * | 6/2021 ............ H04W 24/10 |
| WO | 2014142725 | A1 | | 9/2014 |
| WO | 2019031943 | A1 | | 2/2019 |

OTHER PUBLICATIONS

First Office action issued in corresponding Chinese Application No. 202111408089.1, issued on Jan. 13, 2023, 16 pages.

Communication Pursuant to Article 94(3) EPC issued in corresponding European Application No. 19926834.3, mailed on Jan. 23, 2023, 7 pages.

"Triggering of Conditional Handover in NR", Agenda: 11.9.3 Handover robustness improvements, Source: Ericsson, 3GPP TSG RAN WG2 #105bis, R2-190,3517, Xi'an, China, Apr. 8-12, 2019, 6 pages.

"Operational aspects of conditional handover mechanism", Agenda item: 10.2.7, Source: Samsung, 3GPP TSG-RAN2 AH-1801, R2-1801494, Vancouver, Canada, Jan. 22-Jan. 26, 2018, 4 pages.

Extended European Search Report issued in corresponding European Application No. 19926834.3, mailed Mar. 31, 2022, 13 pages.

"Triggering of Conditional Handover in NR", Source: Ericsson, 3GPP TSG RAN WG2 #105, R2-1900405, Athens, Greece, Feb. 25-Mar. 1, 2019, 6 pages.

"Operational aspects of conditional handover mechanism", Source: Samsung, 3GPP TSG-RAN2#101, R2-1802487 (resubmission of R2-1801494), Athens, Greece, Feb. 26-Mar. 2, 2018, 4 pages.

"Simulation Results on Conditional Handover", Source: ETRI, 3GPP TSG-RAN WG2 Meeting #104, R2-1818048 (Re-submission of R2-1815245), Spokane, USA, Nov. 12-16, 2018, 6 pages.

International Search Report issued in corresponding International Application No. PCT/CN2019/085341, mailed Feb. 5, 2020, 34 pages.

PCT Written Opinion of the International Searching Authority issued in corresponding International Application No. PCT/CN2019/085341, mailed Feb. 5, 2020, 9 pages.

"New WID: NR mobility enhancements", Agenda Item: 9.1.10, Source: Intel Corporation, 3GPP TSG RAN Meeting #80, RP-181433, La Jolla, USA, May 21-May 25, 2018, 5 pages.

* cited by examiner

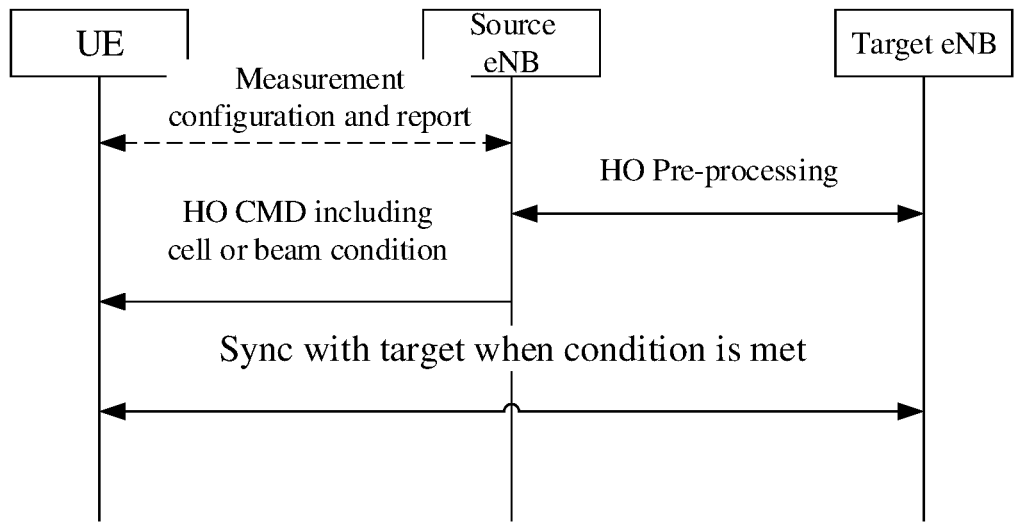
FIG. 4
Processing Unit 51
FIG. 5
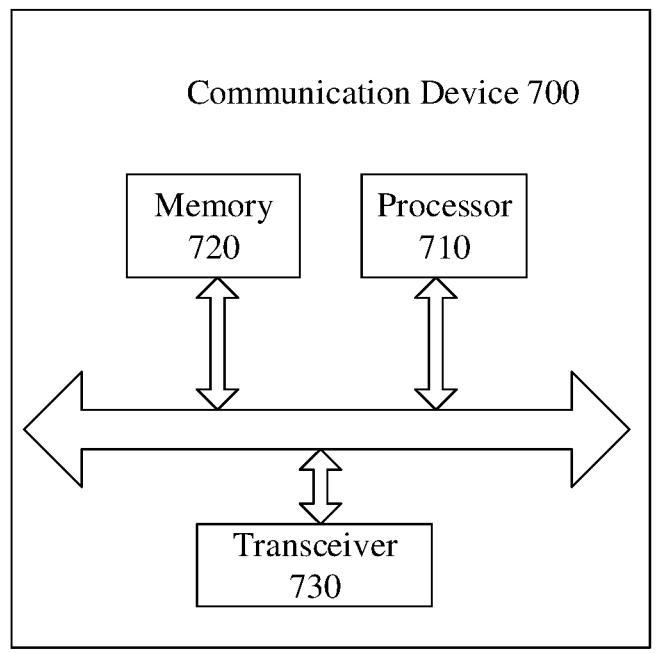
FIG. 6

EVENT PROCESSING METHOD AND USER EQUIPMENT

CROSS-REFERENCE TO RELATED APPLICATION

This application is a continuation of International Application No. PCT/CN2019/085341, filed on Apr. 30, 2019, the entire contents of which are hereby incorporated by reference.

BACKGROUND

The present disclosure relates to the field of information processing technology, and in particular to an event processing method, User Equipment (UE), a chip, a computer readable storage medium, a computer program product, and a computer program.

For both triggering measurement reporting in traditional handover process and triggering handover in conditional handover procedure, a network needs to configure certain channel quality-based events. If these channel quality-based events are met through UE measurement, corresponding actions will be triggered. There is a certain hysteresis mechanism required for meeting these events. Put simply, it is not that the corresponding action is triggered as soon as the event is met, but the corresponding action can be triggered only after the event is met for a certain time duration. For example, FIG. 1A shows an A1 event, that is, the signal quality is higher than a certain threshold. When the A1 event is met for a certain time duration, the corresponding action can be triggered.

SUMMARY

Embodiments of the present disclosure provide an event processing method, User Equipment (UE), a chip, a computer readable storage medium, a computer program product, and a computer program.

In a first aspect, an event processing method is provided, which is applied to User Equipment UE, the method including measuring relevant signals of at least two events; and performing measurement result reporting or handover when the at least two events meet a configured condition.

In a second aspect, a UE is provided, including a processing unit configured to measure relevant signals of at least two events; and perform measurement result reporting or handover when the at least two events meet a configured condition.

In a third aspect, there is provided a UE including a processor and a memory. The memory is configured to store a computer program, and the processor is configured to call and run the computer program stored in the memory to perform the method in the foregoing first or second aspect or the implementations thereof.

In a fourth aspect, there is provided a chip which is used to carry out the method in any one of the above first to second aspects or the implementations thereof.

Specifically, the chip includes a processor configured to call and run a computer program from a memory, to cause a device installed with the chip to perform the method in the foregoing first or any other aspect or the implementations thereof.

In a fifth aspect, a computer-readable storage medium is provided for storing a computer program that causes a computer to perform the method in the foregoing first or any other aspect or the implementations thereof.

In a sixth aspect, a computer program product is provided, including computer program instructions that cause a computer to perform the method in the foregoing first or any other aspect or the implementations thereof.

In a seventh aspect, a computer program is provided which, when running on a computer, causes the computer to perform the method in the foregoing first or any aspect or the implementations thereof.

BRIEF DESCRIPTION OF THE DRAWINGS

FIG. 4 is a second schematic diagram of a handover scenario;

FIG. 5 is a schematic diagram of a composition structure of a UE according to an embodiment of the present disclosure;

FIG. 6 is a schematic diagram of a composition structure of a communication device according to an embodiment of the present disclosure;

DETAILED DESCRIPTION

In order to enable the features and technical contents of the embodiments of the present disclosure to be understand in more detail, implementations of the embodiments of the present disclosure will be described in detail below with reference to the accompanying drawings. The drawings are for reference and explanation purposes only and are not intended to limit the embodiments of the present disclosure.

The technical solutions in the embodiments of the present disclosure will be described below in connection with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

Figure 1A:
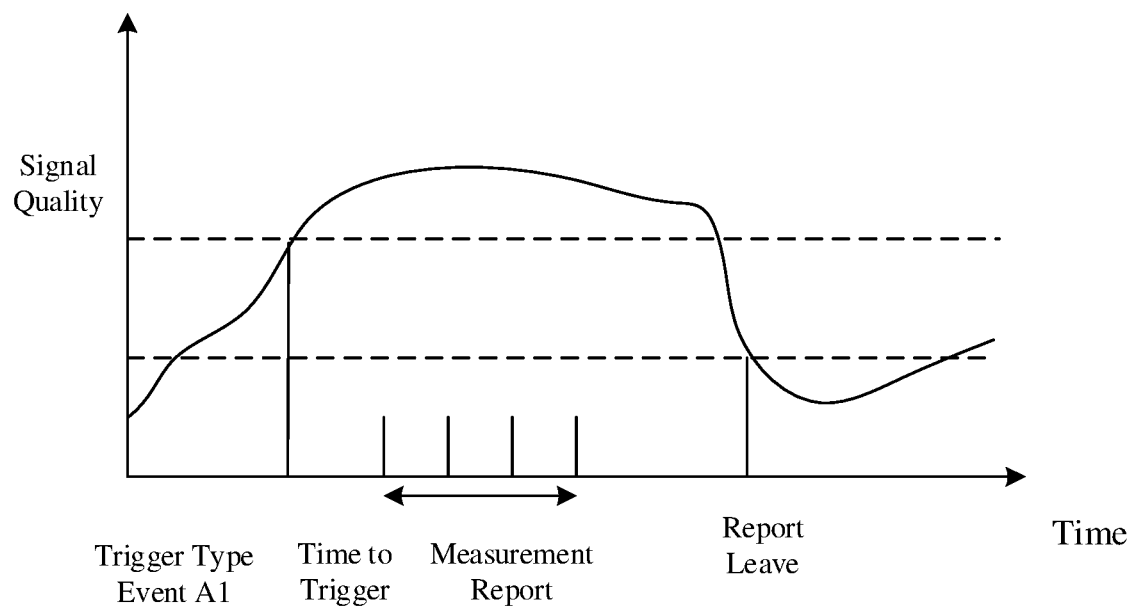
FIG. 1A is a schematic diagram of an event-triggered reporting scenario according to an embodiment of the present disclosure.
Figure 1B:
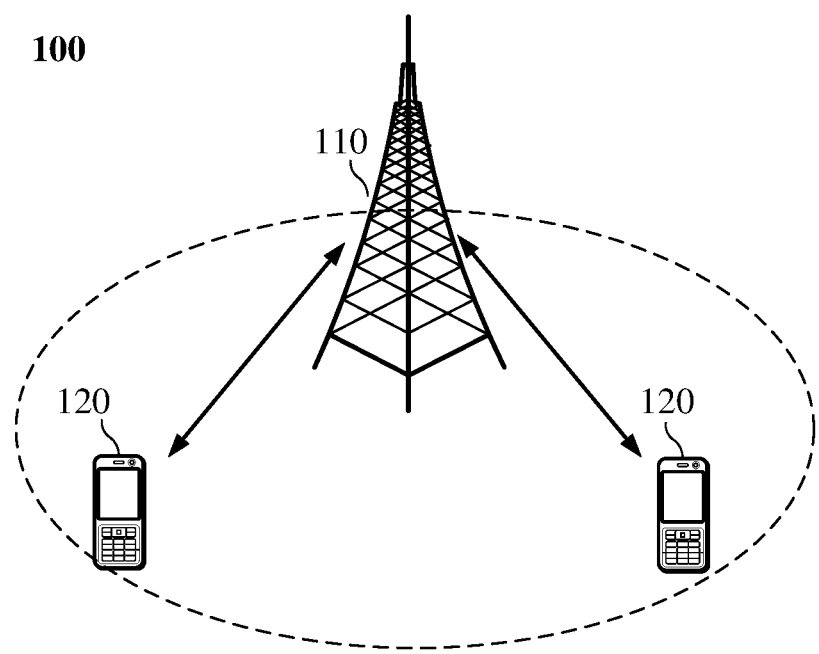
FIG. 1B is a first schematic diagram of a communication system architecture according to an embodiment of the present disclosure.

For example, a communication system 100 to which the embodiments of the present disclosure are applied can be as shown in FIG. 1. The communication system 100 may include a network device 110 which may be a device that communicates with UE 120 (or referred to as a communication terminal or a terminal). The network device 110 can provide communication coverage for a specific geographic area, and can communicate with UEs located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 100 also includes at least one UE 120 located within the coverage area of the network device 110. As used herein, "UE" includes, but is not limited to, a device which communicates via a wired line connection, such as a public switched telephone networks (PSTN), a digital subscriber line (DSL), a digital cable, and a direct cable connection; via another data connection/network; and/or via a wireless interface, such as those for a cellular network, a wireless local area network (WLAN), a digital TV network such as a DVB-H network, a satellite network or an AM-FM broadcast transmitter; a device of another UE that is configured to receive/send communication signals; and/or an Internet of Things (IoT) device. The UE that is configured to communicate through a wireless interface may be referred to as a "wireless communication terminal", a "wireless terminal" or a "mobile terminal".

Optionally, Device to Device (D2D) communication may be performed between the UEs 120.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

In order to enable the features and technical contents of the embodiments of the present disclosure to be understand in more detail, implementations of the embodiments of the present disclosure will be described in detail below with reference to the accompanying drawings. The drawings are for reference and explanation purposes only and are not intended to limit the embodiments of the present disclosure.

Figure 2:
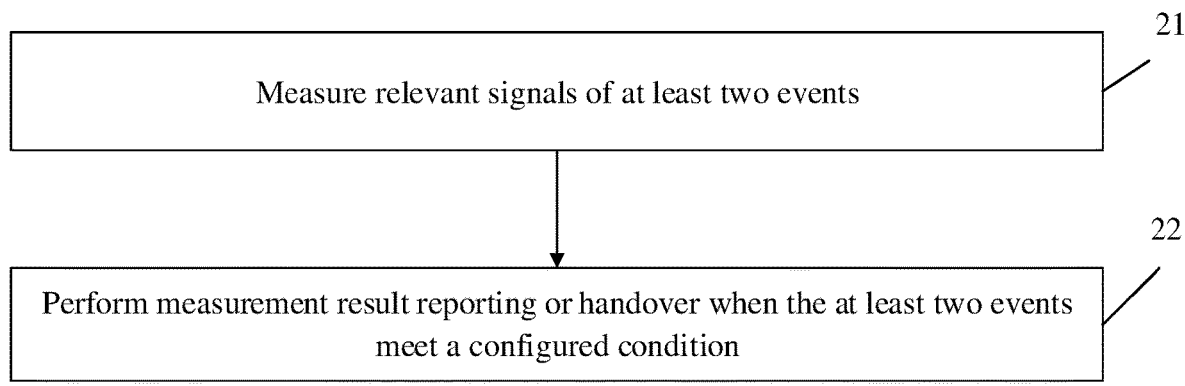
FIG. 2 is a first schematic flow chart of an event processing method according to an embodiment of the present disclosure.

An embodiment of the present disclosure provides an event processing method, which is applied to User Equipment (UE), as shown in FIG. 2, the method including step 21, measuring relevant signals of at least two events; and step 22, performing measurement result reporting or handover when the at least two events meet a configured condition.

Figure 3:
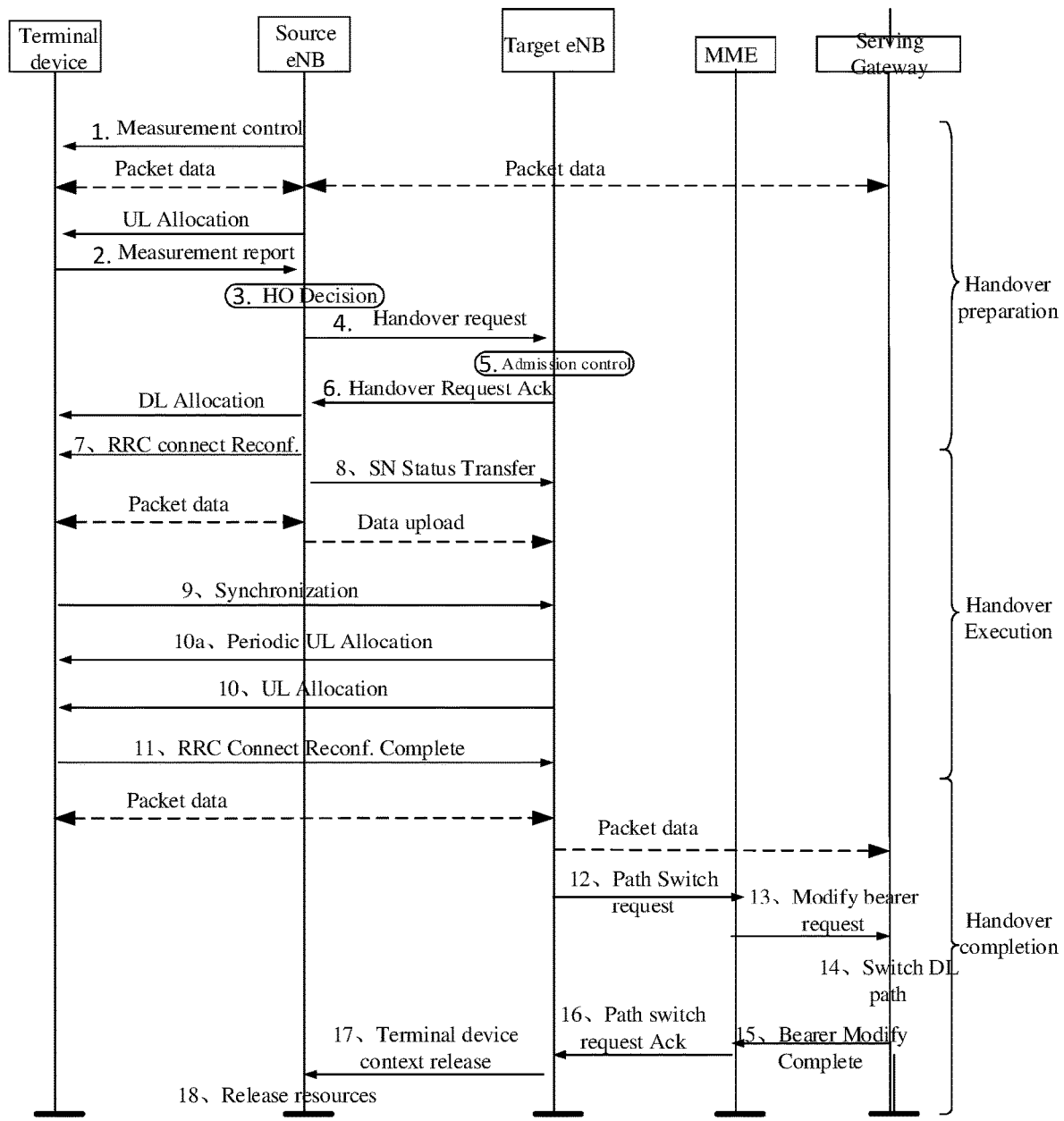
FIG. 3 is a first schematic diagram of a handover scenario.

A main process of handover is shown in FIG. 3, which mainly includes the following.

In a handover preparation phase, a source base station configures the UE to perform measurement reporting, and sends a handover request to a target base station based on a result reported by the UE. After the target base station admits the handover request, it will configure for the UE a RRC message, mobilityControlInformation, which includes information for RACH resources, C-RNTI, target base station security algorithms, and system messages for the target base station. Specifically, it includes steps 1-6 as shown in the figure: a source network device sends measurement control to a terminal device; the terminal device sends a measurement report to the source network device after performing measurement for multiple network devices or cells; the source network device makes handover decision based on the measurement report (or in combination with the RRM information); the source network device sends a handover request to the target network device so that the target network device is prepared for the handover; the target network device performs handover admission control according to the handover request; and when determining to perform the handover, the target network device sends handover request acknowledgment to the source network device.

Then in a handover execution phase, the source base station forwards the mobilityControlInformation to the UE, and after receiving the handover command, the UE initiates a random access procedure to the target base station. At the same time, the source base station sends SN STATUS TRANSFER to the target base station to inform the target base station of uplink PDCP SN receiving status and downlink PDCP SN sending status. It includes steps 7-11 shown in the figure, and specifically includes that: the target network device generates RRC information, sends the RRC connection reconfiguration information to the source network device, and the source network device sends the RRC connection reconfiguration information to the terminal device; after receiving the RRC connection reconfiguration information, the terminal device performs the handover process according to the connection reconfiguration information; then the source network device sends the SN status to the target network device; and the terminal device synchronizes with the target network device, and then receives UL allocation by target network device and sends a RRC connection reconfiguration complete message to the target network device.

Finally in a handover completion phase, when the UE successfully accesses the target base station (the random access succeeds), the target base station sends a PATH SWITCH REQUEST requesting MME to switch the downlink path, and after the path switch is completed, the target base station will instruct the source base station to release the UE context and the switch is completed; for example, it includes steps 12-18 shown in the figure, and specifically includes that the target network device sends a path switch request to the MME to notify the MME that the terminal device changes the cell; the MME sends a bearer modification request to a serving gateway, and the MME performs the downlink path switch process; after completing the process, the serving gateway sends a bearer modification completion response to the MME, and the MME sends a path switch request acknowledgment to the target network device; and the target network device notifies the source network device of the context release of the terminal device and the source network device releases the resources.

In addition, in some special scenarios, such as high-speed movement of the UE or high-frequency conditions, frequent handovers are required. The conditional handover avoids the problem that the handover preparation time is too long and thus it is too late for the UE to perform the handover, and configures a HO command for the UE in advance. For example, in a high-speed train scenario, the UE has a specific movement trajectory, and the process procedure thereof is shown in FIG. 4. Therefore, the base station can allocate the target base station to the UE in advance, and the handover command includes a condition for triggering the UE to perform the handover. When the configured condition is met, the UE initiates an access request to the target base station and synchronizes with the target, that is, the handover is completed.

Based on the foregoing description, this embodiment is described in combination with the following scenarios.

Scenario 1. In a case where the network side configures at least two events for the UE, only when trigger conditions for two or more events are met, can the related actions be triggered, such as triggering measurement result reporting and/or handover operations.

The configured conditions being met include each of the at least two events meets a corresponding trigger condition; and/or a timing duration meets a first preset duration.

Different events in the at least two events differ in at least one of the following aspects: using signals of different cells; using different types of reference signals; for example, different events correspond to different reference signals such as SSBs or Channel State Information Reference Signals (CSI-RSs); using different signal quality indicators; for example, different events use at least one of different Signal to Interference plus Noise Ratios (SINRs), Reference signal received powers (RSRPs), Reference Signal Received Qualities (RSRQs), and Received Signal Strength Indicators (RSSIs), where it should be noted that there may be more signal quality indicators which are not exhausted in this embodiment; and using different event trigger thresholds; for example, different trigger thresholds can be set for different events, and the specific values thereof can be set according to actual conditions, which will not be repeated here.

The UE measures the signals related to the at least two events according to the configuration for the at least two events by the network.

It further includes starting timing when all of the at least two events meet the respective trigger conditions.

After the timing is started, the method further includes triggering performance of the measurement result reporting or handover when the timing duration meets the first preset duration.

That is to say, only when the relevant conditions for the at least two events are all met, evaluation for the first time duration is started. Moreover, only when the at least two events being met continues for a certain time duration, a corresponding action is triggered, for example, the measurement reporting is triggered or the condition-triggered handover is performed.

The starting of the timing may be embodied as an entering condition related to the event being met.

The above timing can be implemented by a first timer, that is, when all of the at least two events meet the respective trigger conditions, the first timer is controlled to start or restart, and when the timing duration of the first timer reaches the first preset time duration, it can be determined that the configured condition is met, and then the performance of the measurement result reporting and/or handover process is triggered.

It should be noted that the aforementioned timing duration is not un-interruptible or un-terminable. For example, when at least one of the at least two events does not meet the corresponding trigger condition, the timing ends. The ending of the timing may be embodied as a leaving condition related to the event being met.

That is to say, even if it has been confirmed that all the at least two events meet the respective trigger conditions, some network conditions, such as poor signal quality, may cause some of the at least two events to come into a state of not meeting the trigger condition. At this point, the timing is controlled to stop. For example, specifically, the first timer can be stopped.

Further, after the timing stops (for example, the first timer is stopped), it is possible to continue to perform determination as to whether the at least two events meet the trigger conditions, and the timing can be restarted, for example, the first timer is restarted, when all the events meet the trigger conditions again.

For example, the network side configures an event A and an event B for the UE, and when both the events A and B meet the corresponding trigger conditions, the first timer is controlled to start; and when the timing duration of the first timer reaches the first preset duration, it is determined to perform the handover (or it is determined to trigger the measurement result reporting).

Scenario 2. It differs from scenario 1 in that in this scenario, it is not necessary to start timing until all the events meet the trigger conditions. The configured condition being met include partial events of the at least two events meet corresponding trigger conditions; and/or a timing duration meets a second preset duration.

The partial events are not all the events. For example, there are currently two events, and the timing starts as long as one of them meets the trigger condition.

The specific description is as follows.

Different events in the at least two events differ in at least one of the following aspects: using signals from different cells; using different types of reference signals; for example, different events correspond to different reference signals such as SSBs or Channel State Information Reference Signals (CSI-RSs); using different signal quality indicators; for example, different events use at least one of different Signal to Interference plus Noise Ratios (SINRs), Reference signal received powers (RSRPs), Reference Signal Received Qualities (RSRQs), and Received Signal Strength Indicators (RSSIs), where it should be noted that there may be more signal quality indicators which are not be exhausted in this embodiment; and using different event trigger thresholds; for example, different trigger thresholds can be set for different events, and the specific values thereof can be set according to actual conditions, which will not be repeated here.

The UE measures the signals related to the at least two events according to the configuration for the at least two events by the network.

It can further include starting timing when partial events of the at least two events meet the respective trigger conditions.

After the timing is started, the method further includes triggering execution of the measurement result reporting or the handover when the timing duration meets the second preset duration and events other than the partial events meet the corresponding trigger conditions.

That is, when the relevant conditions for the partial events of the at least two events are met, the evaluation for the second time duration is started.

The starting of the timing may be embodied as an entering condition related to the event being met.

It should also be noted that, in this embodiment, the partial events may be specified events, or may be events that firstly meet a preset trigger condition, where the specified events may be at least one event pre-configured by the network side for the UE. For example, events A, B, and C are configured by the network side, and it is specified to start timing when events A and C meet the trigger conditions.

Or, the number or proportion of the partial events that firstly meet the preset trigger conditions can be set according to actual conditions, or can be specified by the network side, or can be determined by the UE itself. For example, there are currently 5 events, and it can be set such that the timing starts after two events firstly meet the preset trigger conditions. For another example, there are currently 5 events, and the timing can start as long as 30% of the events meet the corresponding trigger conditions.

Of course, there may be more situations in actual processing, which are not exhausted in this embodiment.

The above timing can be implemented by a second timer, that is to say, when partial events of the at least two events meet the corresponding trigger conditions, the second timer is controlled to start or restart, and when the timing duration of the second timer reaches the second preset duration and events other than the partial events all meet the corresponding trigger conditions, it can be determined that the configured condition is met, and then execution of the measurement result reporting and/or handover process can be triggered.

Only when the at least one event being met continues for a certain time duration and at this time the relevant conditions for other events than the at least one event among the at least two events are met (that is, the other events being met may not continue for the certain time duration), the corresponding action, such as execution of the measurement reporting or the condition-triggered handover, is triggered.

That is to say, the execution of the measurement result reporting or the handover can be triggered when all the other events than the partial events can meet the corresponding trigger conditions before the timing duration reaches the second preset duration.

It should be noted that the aforementioned timing duration is not un-interruptible or un-terminable. For example, when at least one of the at least partial events does not meet the corresponding trigger condition, the timing ends. The ending of the timing may be embodied as the leaving condition related to the event being met.

That is to say, even if it has been confirmed that all the partial events meet the respective trigger conditions, some network conditions, such as poor signal quality, may cause one or more of the partial events to come into a state of not meeting the trigger condition. At this point, the timing is controlled to stop. For example, specifically, the second timer can be stopped.

Further, after the timing stops (for example, the second timer is stopped), it is possible to continue to perform determination as to whether the at least two events meet the trigger conditions, and the timing can be restarted, for example, the second timer is restarted, when partial events of all the events meet the trigger conditions again.

For example, the network side configures events A, B, C, and D for the UE. When the events A and B meet the corresponding trigger conditions, the second timer is controlled to start; and when the events C and D also meet the corresponding trigger conditions before the timing duration of the second timer reaches the second preset duration, it can be determined to perform the handover (or determined to trigger the execution of the measurement result reporting) when the second timer reaches the second preset duration.

It can be seen that with the above technical solutions, when multiple events are configured, the UE side can measure the relevant signals of the multiple events, and determine, based on the configured condition, whether to report the measurement result or perform handover, thereby providing a processing method as to how to trigger execution of the measurement reporting or the handover in the case where the multiple events and the trigger conditions thereof are jointly configured.

An embodiment of the present disclosure provides a UE, as shown in FIG. 5, which includes a processing unit 51 configured to measure relevant signals of at least two events; and perform measurement result reporting or handover when the at least two events meet a configured condition.

Based on the foregoing description, this embodiment is described in combination with the following scenarios.

Scenario 1. In a case where the network side configures at least two events for the UE, only when trigger conditions for two or more events are met, can the related action, such as the measurement result reporting and/or handover operation, be triggered.

The configured condition being met includes each of the at least two events meets a corresponding trigger condition; and/or a timing duration meets a first preset duration.

Different events in the at least two events differ in at least one of the following aspects: using signals of different cells; using different types of reference signals; for example, different events correspond to different reference signals such as SSBs or Channel State Information Reference Signals (CSI-RSs); using different signal quality indicators; for example, different events use at least one of different Signal to Interference plus Noise Ratios (SINRs), Reference signal received powers (RSRPs), Reference Signal Received Qualities (RSRQs), and Received Signal Strength Indicators (RSSIs), where it should be noted that there may be more signal quality indicators which are not be exhausted in this embodiment; and using different event trigger thresholds; for example, different trigger thresholds can be set for different events, and the specific values thereof can be set according to actual conditions, which will not be repeated here.

The UE measures the signals related to the at least two events according to the configuration for the at least two events by the network.

Furthermore, the processing unit 51 starts timing when all of the at least two events meet the corresponding trigger conditions; and triggers execution of the measurement result reporting or handover when a timing duration meets a first preset duration.

That is to say, only when the relevant conditions for the at least two events are all met, evaluation for the first time duration is started. Moreover, only when the at least two events being met continues for a certain time duration, a corresponding action is triggered, for example, the measurement reporting is triggered or the condition-triggered handover is performed.

The starting of the timing may be embodied as an entering condition related to the event being met.

The above timing can be implemented by a first timer, that is, when all of the at least two events meet the respective trigger conditions, the first timer is controlled to start or restart, and when the timing duration of the first timer reaches the first preset time duration, it can be determined that the configured condition is met, and then the execution of the measurement result reporting and/or handover process is triggered.

It should be noted that the aforementioned timing duration is not un-interruptible or un-terminable. For example, when at least one of the at least two events does not meet the corresponding trigger condition, the processing unit 51 ends the timing. The ending of the timing may be embodied as a leaving condition related to the event being met.

That is to say, even if it has been confirmed that all the at least two events meet the respective trigger conditions, some network conditions, such as poor signal quality, may cause some of the at least two events to come into a state of not meeting the trigger condition. At this point, the timing is controlled to stop. For example, specifically, the first timer can be stopped.

Further, after the timing stops (for example, the first timer is stopped), it is possible to continue to perform determination as to whether the at least two events meet the trigger conditions, and the timing can be restarted, for example, the first timer can be restarted, when all the events meet the trigger conditions again.

For example, the network side configures an event A and an event B for the UE, and when both the events A and B meet the corresponding trigger conditions, the first timer is controlled to start; and when the timing duration of the first timer reaches the first preset duration, it is determined to perform the handover (or it is determined to trigger the execution of the measurement result reporting).

Scenario 2. It differs from scenario 1 in that in this scenario, it is not necessary to start timing until all the events meet the trigger conditions. The specific description is as follows.

The configured condition being met includes partial events of the at least two events meet corresponding trigger conditions; and/or a timing duration meets a second preset duration.

The partial events are not all the events. For example, there are currently two events, and the timing starts when one of them meets the trigger condition.

The different events in the at least two events differ in at least one of the following aspects: using signals of different cells; using different types of reference signals; for example, different events correspond to different reference signals such as SSBs or Channel State Information Reference Signals (CSI-RSs); using different signal quality indicators; for example, different events use at least one of different Signal to Interference plus Noise Ratios (SINRs), Reference signal received powers (RSRPs), Reference Signal Received Qualities (RSRQs), and Received Signal Strength Indicators (RSSIs), where it should be noted that there may be more signal quality indicators which are not exhausted in this embodiment; and using different event trigger thresholds; for example, different trigger thresholds can be set for different events, and the specific values thereof can be set according to actual conditions, which will not be repeated here.

The processing unit 51 measures the signals related to the at least two events according to the configuration for the at least two events by the network.

Furthermore, the processing unit 51 starts timing when at least partial events of the at least two events meet the corresponding trigger conditions; and triggers execution of the measurement result reporting or the handover when the timing duration meets the second preset duration and other events than the at least partial events meet the corresponding trigger conditions.

That is, when the relevant conditions for the partial events of the at least two events are met, the evaluation for the second time duration is started.

The starting of the timing may be embodied as an entering condition related to the event being met.

It should also be noted that, in this embodiment, the partial events may be specified events, or may be events that firstly meet a preset trigger condition, where the specified events may be at least one event pre-configured by the network side for the UE. For example, events A, B, and C are configured by the network side, and it is specified to start timing when the events A and C meet the trigger conditions.

Or, the number or proportion of the partial events that firstly meet the preset trigger conditions can be set according to actual conditions, or can be specified by the network side, or can be determined by the UE itself. For example, there are currently 5 events, and it can be set such that the timing starts after two events firstly meet the preset trigger conditions. For another example, there are currently 5 events, and the timing can start as long as 30% of the events meet the corresponding trigger conditions.

Of course, there may be more situations in actual processing, which are not exhausted in this embodiment.

The above timing can be implemented by a second timer, that is to say, when partial events of the at least two events meet the corresponding trigger conditions, the second timer is controlled to start or restart, and when the timing duration of the second timer reaches the second preset duration and other events than the at least partial events all meet the corresponding trigger conditions, it can be determined that the configured conditions are met, and then execution of the measurement result reporting and/or handover process can be triggered.

Only when the at least one event being met continues for a certain time duration and at this time the relevant conditions for other events than the at least one event of the at least two events are met (that is, the other events being met may not continue for the certain time duration), the corresponding action, such as the measurement reporting or execution of the condition-triggered handover, is triggered.

That is to say, the execution of the measurement result reporting or the handover can be triggered when all the other events than the partial events can meet the corresponding trigger conditions before the timing duration reaches the second preset duration.

It should be noted that the aforementioned timing duration is not un-interruptible or un-terminable. For example, when at least one of the at least partial events does not meet the corresponding trigger condition, the processing unit 51 ends the timing. The ending of the timing may be embodied as a leaving condition related to the event being met.

That is to say, even if it has been confirmed that all the partial events meet the respective trigger conditions, some network conditions, such as poor signal quality, may cause one or more of the partial events to come into a state of not meeting the trigger condition. At this point, the timing is controlled to stop. For example, specifically, the second timer can be stopped.

Further, after the timing stops (for example, the second timer is stopped), it is possible to continue to perform determination as to whether the at least two events meet the trigger conditions, and the timing can be restarted, for example, the second timer is restarted, when partial events of all the events meet the trigger conditions again.

For example, the network side configures events A, B, C, and D for the UE. When the events A and B meet the corresponding trigger conditions, the second timer is controlled to start; and when the events C and D also meet the corresponding trigger conditions before the timing duration of the second timer reaches the second preset duration, it can be determined to perform the handover (or determined to trigger the execution of the measurement result reporting) when the second timer reaches the second preset duration.

It can be seen that with the above technical solutions, when multiple events are configured, the UE side can measure the relevant signals of the multiple events, and determine, based on the configured condition, whether to report the measurement result or perform handover, thereby providing a processing method as to how to trigger execution of the measurement reporting or the handover in the case where the multiple events and the trigger conditions thereof are jointly configured.

FIG. 6 is a schematic structural diagram of a communication device 700 provided by an embodiment of the present disclosure. The communication device in this embodiment may be specifically the first terminal or the second terminal in the foregoing embodiments. The communication device 700 shown in FIG. 6 includes a processor 710, and the processor 710 can call and run a computer program from a memory to implement the methods in the embodiments of the present disclosure.

Optionally, as shown in FIG. 6, the communication device 700 can further include a memory 720. The processor 710 can call and run the computer program from the memory 720 to carry out the methods in the embodiments of the present disclosure.

The memory 720 can be a separate device independent of the processor 710, or can be integrated in the processor 710.

Optionally, as shown in FIG. 6, the communication device 700 can further include a transceiver 730, and the processor 710 can control the transceiver 730 to communicate with other devices, and specifically to transmit information or data to other devices, or receive information or data transmitted from other devices.

The transceiver 730 can include a transmitter and a receiver. The transceiver 730 can further include an antenna, and the number of the antennas can be one or more.

Optionally, the communication device 700 can specifically be a terminal in the embodiments of the disclosure, and the communication device 700 can implement the corresponding processes which are implemented by the mobile terminal/terminal device in the methods according to the embodiments of the present disclosure, which will not be repeated here for the sake of brevity.

Figure 7:
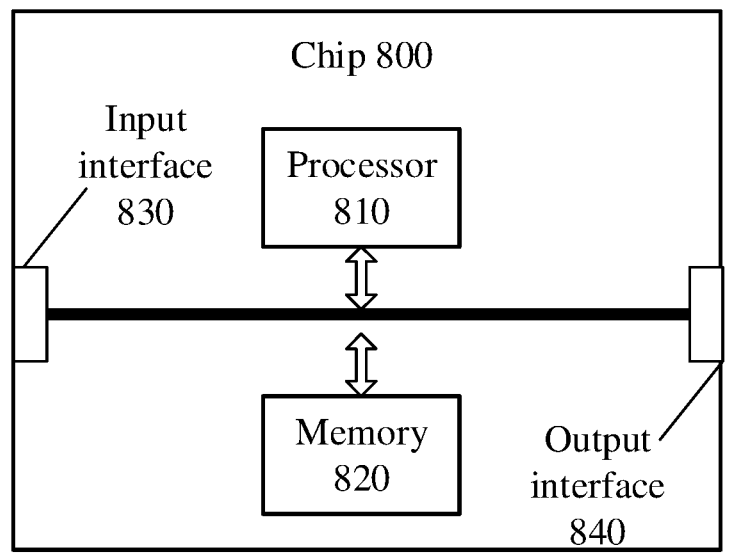
FIG. 7 is a schematic block diagram of a chip according to an embodiment of the present disclosure.

FIG. 7 is a schematic structural diagram of a chip according to an embodiment of the present disclosure. The chip 800 shown in FIG. 7 includes a processor 810 which can call and run a computer program from a memory to implement the methods according to the embodiments of the present disclosure.

Optionally, as shown in FIG. 7, the chip 800 can further include a memory 820. The processor 810 can call and run the computer program from the memory 820 to carry out the methods in the embodiments of the present disclosure.

The memory 820 can be a separate device independent of the processor 810, or can be integrated in the processor 810.

Optionally, the chip 800 can further include an input interface 830. The processor 810 can control the input interface 830 to communicate with other devices or chips, and specifically, to obtain information or data transmitted by other devices or chips.

Optionally, the chip 800 can further include an output interface 840. The processor 810 can control the output interface 840 to communicate with other devices or chips, and specifically, to output information or data to other devices or chips.

Optionally, the chip can be applied to the terminal device in the embodiments of the present disclosure, and the chip can carry out the corresponding processes which are implemented by the terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

Figure 8:
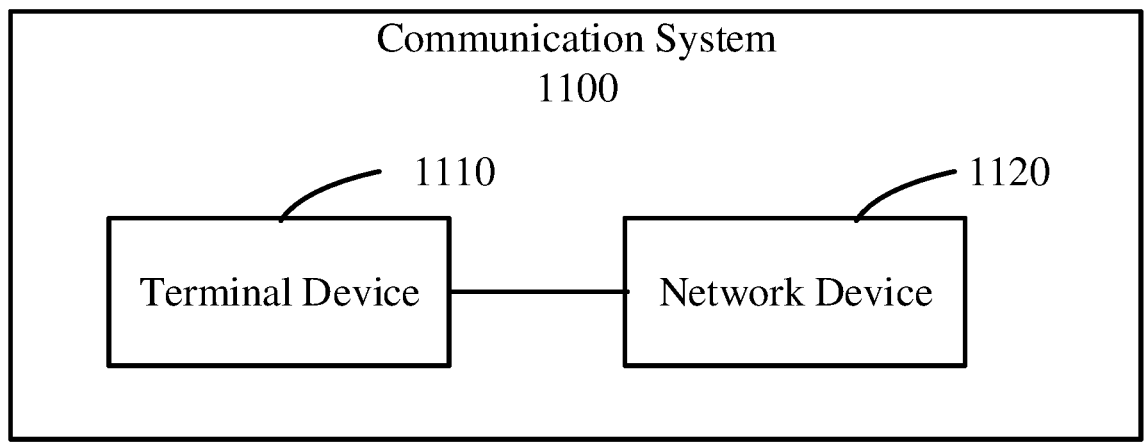
FIG. 8 is a second schematic diagram of a communication system architecture according to an embodiment of the present disclosure.

FIG. 8 is a schematic block diagram of a communication system 1100 according to an embodiment of the present disclosure. As shown in FIG. 8, the communication system 1100 includes a terminal device 1110 and a network device 1120.

The terminal device 1110 can be used to implement the corresponding functions implemented by the terminal device in the above methods, and the network device 1120 can be used to implement the corresponding functions implemented by the network device in the above methods, which will not be repeated here for the sake of brevity.

An embodiment of the present disclosure also provides a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the terminal device in the embodiments of the present disclosure, and the computer program causes the computer to perform the corresponding processes which are implemented by the mobile terminal/terminal device in the methods of the embodiments of the present disclosure. For the sake of brevity, a repeated description is omitted here.

An embodiment of the present disclosure also provides a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the disclosure also provides a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for event processing applied to User Equipment (UE), comprising:
   measuring relevant signals of at least two events; and
   performing handover when the at least two events meet a configured condition,
   wherein meeting the configured condition comprises at least one of:
   partial events of the at least two events meet corresponding trigger conditions; or a timing duration meets a second preset duration,
wherein the method further comprises:
starting timing when the partial events of the at least two events meet the corresponding trigger conditions;
after the timing is started, triggering performance of the handover when the timing duration meets the second preset duration and other events than the partial events meet the corresponding trigger conditions; and
ending the timing when at least one of the partial events does not meet the corresponding trigger condition.

2. The method according to claim 1, wherein different events in the at least two events have at least one of the following different aspects:
using signals of different cells;
using different signal quality indicators;
using different event trigger thresholds;
using different Signal to Interference plus Noise Ratios;
using different Reference Signal Received Powers; and
using different Reference Signal Received Qualities.

3. A UE, comprising:
a processor; and
a memory configured to store a computer program executable by the processor,
wherein the processor is configured to:
execute the computer program stored in the memory to measure relevant signals of at least two events; and
perform handover when the at least two events meet a configured condition,
wherein meeting the configured condition comprises at least one of:
partial events of the at least two events meet the corresponding trigger conditions; or
a timing duration meets a second preset duration,
wherein the processor is configured to:
start timing when the partial events of the at least two events meet the corresponding trigger conditions;
trigger performance of the handover when the timing duration meets the second preset duration and other events than the at least partial events meet the corresponding trigger conditions; and
end the timing when at least one of the at least partial events does not meet the corresponding trigger condition.

4. The UE according to claim 3, wherein different events in the at least two events have at least one of the following different aspects:
using signals of different cells;
using different signal quality indicators;
using different event trigger thresholds;
using different Signal to Interference plus Noise Ratios;
using different Reference Signal Received Powers; and
using different Reference Signal Received Qualities.

5. A non-transitory computer-readable storage medium for storing a computer program that causes a computer to perform an event processing method applied to User Equipment (UE), the method comprising:
measuring relevant signals of at least two events; and
performing handover when the at least two events meet a configured condition,
wherein meeting the configured condition comprises at least one of:
partial events of the at least two events meet the corresponding trigger conditions; or
a timing duration meets a second preset duration,
wherein the method further comprises:
starting timing when the partial events of the at least two events meet the corresponding trigger conditions;
after the timing is started, triggering performance of the handover when the timing duration meets the second preset duration and other events than the partial events meet the corresponding trigger conditions; and
ending the timing when at least one of the partial events does not meet the corresponding trigger condition.

6. The non-transitory computer-readable storage medium according to claim 5, wherein different events in the at least two events have at least one of the following different aspects:
using signals of different cells;
using different signal quality indicators;
using different event trigger thresholds;
using different Signal to Interference plus Noise Ratios;
using different Reference Signal Received Powers; and
using different Reference Signal Received Qualities.

* * * * *